United States Patent [19]
Koerber et al.

[11] Patent Number: 5,916,659
[45] Date of Patent: Jun. 29, 1999

[54] COMPOSITES OF FLUOROPOLYMERS WITH THERMALLY NON-ADHERENT NON-FLUOROPOLYMERS AND METHODS FOR PRODUCING THE SAME

[75] Inventors: Keith Gordon Koerber, Goffstown; James Michael McMartin, Hooksett, both of N.H.; John Walter Verbicky, Jr., York Beach, Me.; John Effenberger, Bedford; J. George Drobny, Merrimack, both of N.H.

[73] Assignee: Chemfab Corporation, Merrimack, N.H.

[21] Appl. No.: 08/582,633

[22] Filed: Jan. 14, 1996

Related U.S. Application Data

[63] Continuation of application No. 08/186,389, Jan. 24, 1994, abandoned.

[51] Int. Cl.$^6$ .............................. B32B 5/02; B32B 7/08; B32B 27/08; B32B 27/12
[52] U.S. Cl. ................................ 428/86; 428/90; 428/91; 428/95; 428/96; 428/97; 428/421; 428/422; 428/522; 442/65; 442/66; 442/67; 442/164; 442/165; 442/166; 442/168; 442/169; 442/394; 442/396; 442/397; 442/398; 156/298; 156/299; 156/300; 156/308.2; 156/309.6; 156/313
[58] Field of Search ............................. 428/86, 223, 227, 428/245, 252, 254, 272, 289, 290, 269, 238, 247, 421, 422, 522, 90, 91, 95, 96, 97; 442/50, 58, 65, 66, 67, 82, 88, 91, 94, 164, 165, 166, 167, 168, 169, 327, 394, 396, 397, 398

[56] References Cited

U.S. PATENT DOCUMENTS

| | | | |
|---|---|---|---|
| 2,593,553 | 4/1952 | Francis, Jr. | 154/37 |
| 3,026,229 | 3/1962 | Wilcox | 156/309 |
| 3,591,444 | 7/1971 | Hoppe | 161/53 |
| 3,900,651 | 8/1975 | Hoppe et al. | 428/86 |
| 4,029,837 | 6/1977 | Leatherman | 428/247 |
| 4,273,815 | 6/1981 | Gifford et al. | 428/35 |
| 4,324,474 | 4/1982 | Kraemer et al. | 355/65 |
| 4,528,051 | 7/1985 | Heinze et al. | 156/92 |
| 4,560,603 | 12/1985 | Giacomel | 428/86 |
| 4,677,017 | 6/1987 | DeAntonis et al. | 428/214 |
| 4,704,323 | 11/1987 | Duncan et al. | 428/286 |
| 4,740,562 | 4/1988 | Menke et al. | 525/366 |
| 4,749,607 | 6/1988 | Ochiumi | 428/215 |
| 4,865,903 | 9/1989 | Adiletta | 428/215 |
| 4,946,903 | 8/1990 | Gardella et al. | 525/326.4 |
| 4,988,540 | 1/1991 | Bragaw et al. | 427/155 |
| 5,076,875 | 12/1991 | Padden | 156/313 |
| 5,082,721 | 1/1992 | Smith, Jr. et al. | 428/252 |
| 5,108,836 | 4/1992 | Ocampo et al. | 428/335 |
| 5,139,878 | 8/1992 | Kim et al. | 428/421 |
| 5,302,225 | 4/1994 | Padden | 156/309.3 |
| 5,382,461 | 1/1995 | Wu | 428/86 |

FOREIGN PATENT DOCUMENTS 0159942  10/1985  European Pat. Off. .

OTHER PUBLICATIONS

BE 810,979 (May 29, 1974) Dialog Abstract No. 001173362.
WO 9006337 (Jun. 14, 1990) Dialog Abstract No. 008322755.
JP 1193350 (Aug. 3, 1989) Dialog Abstract No. 02895750.
JP 60094607 (May 27, 1985) Dialog Abstract No. 01616107.

*Primary Examiner*—Vivian Chen
*Attorney, Agent, or Firm*—White & Case L.L.P.

[57] ABSTRACT

A composite of thermally non-adherent fluoropolymeric and non-fluoropolymeric components is created through the agency of a non-woven, fibrous binder interposed between and portionally embedded into both components. The fibers of the non-woven binder have a substantial portion of their length extending into both components and cross the interface at an angle that is substantially normal to the plane of embedment. The composite possesses good peel strengths of greater than 5 pounds/linear inch between the otherwise thermally non-adherent components.

13 Claims, No Drawings

COMPOSITES OF FLUOROPOLYMERS WITH THERMALLY NON-ADHERENT NON-FLUOROPOLYMERS AND METHODS FOR PRODUCING THE SAME

This application is a continuation of application Ser. No. 08/186,389, filed on Jan. 24, 1994, abandoned.

BACKGROUND OF THE INVENTION

1. Field of the Invention

The present invention relates to stratified composites containing polymers which do not readily adhere to each other under the influence of heat and pressure. In particular, the present invention relates to laminar composites consisting of discrete layers of fluoropolymeric and non-fluoropolymeric materials which possess improved peel adhesive properties through the novel use of a fibrous binder.

Many commercially available polymers exhibit a wide range of useful mechanical, physical, and electrical bulk properties, and are available at an economically attractive cost. But these relatively low-cost polymers are often excluded from applications which require surface properties more typically associated with the more costly fluoropolymers, such as exceptional weatherability, flame-spread inhibition, enhanced solvent resistance, durable hydrophobicity and release properties.

To obtain these enhanced fluoropolymeric surface characteristics and still benefit from the good bulk properties and economics of the lower cost polymers, it would be advantageous to create a composite by laminating a fluoropolymer to the surface of such low-cost, non-fluoropolymers. Unfortunately, however, direct thermal lamination of fluoropolymers to non-fluoropolymers in a temperature range at or above the softening or melting point of the non-fluoropolymeric material too often results in a composite with such low interfacial peel-adhesion that delamination is a commonly encountered phenomenon, severely limiting use. Such non-fluoropolymers are said to be thermally non-adherent to fluoropolymers; heat and pressure used in typical lamination processes are insufficient to develop significant interfacial peel adhesion between the components. Moreover, interfacial peel-adhesion is often so low that such a composite cannot practically be prepared.

It would, therefore, be desirable to devise a simple method for preparing a composite containing both a fluoropolymeric component and a non-fluoropolymeric component, wherein the interfacial peel-adhesion between such materials is significantly enhanced. Composites with such improved behavior would find potential use in applications, such as waste pond liners, molded gas tanks, and exterior as well as interior architectural components, such as roofs and walls.

2. Description of the Prior Art

Several approaches to laminating fluoropolymeric and non-fluoropolymeric materials which otherwise exhibit little or no peel-adhesion to each other have been attempted.

These include, for example, the use of an interposed adhesive layer as in U.S. Pat. No. 5,139,878 (Kim et al.), or the application of hot melt adhesive between them as in U.S. Pat. No. 4,677,017 and U.S. Pat. No. 4,273,815. Additives which promote adhesion, such as ferrites, are also described in Japanese Patent No. 1,193,350.

Another approach, disclosed in U.S. Pat. No. 5,108,836 (Ocampo et al.), employs a film in which a concentration gradient of a fluoropolymer blend is established across its thickness. Such a film may then be adhered via its non-fluoropolymeric-rich surface to coated fabrics by heat and pressure.

Other methods involve the use of co-polymerized or grafted functional groups to promote adhesion, such as in U.S. Pat. No. 4,749,607 (Masahide).

Yet another chemical approach to promoting adhesion includes surface modification via oxidation, reduction, or substitution (U.S. Pat. No. 4,946,903 and U.S. Pat. No. 4,740,562).

The use of synthetic woven and non-woven fabrics of PTFE and it copolymers has been described for the preparation of mechanically toughened, multilayer membranes based on perfluoro ion exchange resins (International Patent Application Publication No. 90/06337). Mechanical needling of PTFE and non-woven fabrics with fluoropolymers has also been described for laminating fluoropolymers in the manufacture of protective clothing (Japanese Patent No. 60094607 and U.S. Pat. No. 4,324,474). Composite fabrics have been prepared by coating fabrics on one side with plastic foams and subsequently bonding the coated fabric to a thermoplastic substrate (Belgian Patent No. 810,979).

U.S. Pat. No. 4,988,549 (Bragaw Jr. et al.) discloses a laminate comprising two adjacent layers of fluoropolymer, at least one of which is polyvinyl fluoride, the laminate being free from adhesive between the adjacent fluoropolymer layers. This laminate is produced by forming a first fluoropolymer layer, applying a second fluoropolymer layer as a dispersion to the first fluoropolymer, and coalescing the second fluoropolymer to the first fluoropolymer at a temperature below the melting point of the first fluoropolymer. This reference also discloses an embodiment wherein a reinforcing net or scrim is interposed between the two fluoropolymer layers.

U.S. Pat. No. 3,026,229 (Wilcox) discloses a method for laminating dissimilar synthetic polymers by sandwiching a composite waterleaf comprising a blend of fibrils of the polymers between the sheets prior to hot pressing, whereby each sheet is contiguous with at least some fibrils of the corresponding polymers. During the hot pressing operation, the fibrils in the composite waterleaf substantially lose their identity as fibrils, and the entire assembly becomes consolidated or fused into a compact and inseparably bonded polymeric mass.

U.S. Pat. No. 2,593,553 (Francis) discloses an open mesh textile fabric coated on each side with an organic thermoplastic film. Upon applying heat and pressure to the laminate, the films fuse to each other in the spaces between the yarns of the open mesh fabric.

European Patent Application No. 0 159 942 discloses a laminate, wherein a film is contacted to a substrate. The substrate is first treated to facilitate adhesion and bonding with the film. In one embodiment, where a substrate is laminated with a certain matrix on only one face, the substrate may be adhered to a different film matrix on its other face. The substrate may comprise woven or non-woven materials, such as KEVLAR and NOMEX.

All of these methods admit of either an unacceptable degree of costly complexity or introduce additives which limit applicability. Accordingly, it is an object of this invention to achieve a simple and direct method for laminating a fluoropolymer with a non-fluoropolymer, which avoids these shortcomings to obtain composites having improved interfacial peel-adherence.

SUMMARY OF THE INVENTION

It has been found that, where a fluoropolymeric component and a non-fluoropolymeric component are thermally non-adherent to each other—that is, the heat and pressure used in typical lamination processes are insufficient to develop significant peel-adhesion between the components—a composite of such components possessing good peel-adhesion behavior can be achieved using a non-woven, fibrous binder physically embedded in, and possessing fibers extending into both fluoropolymeric and non-fluoropolymeric components. A portion of the cross-sectional thickness of the non-woven binder is embedded into the fluoropolymeric component and part or all of the remaining portion of cross-sectional thickness of the binder is embedded into the non-fluoropolymeric component. The fibers of the interposed non-woven binder experience a sheer force at their interface with each component when stressed, and can serve as a good mechanical anchorage between the components. To this end, it is appropriate for such fibers to have a substantial portion of their length extending into both the fluoropolymeric and non-fluoropolymeric components, and for a substantial portion of them to cross the interface at an angle that is normal or near-normal to the plane of embedment. As desired, the sheer forces may also be enhanced through use of appropriate coupling agents on the fibrous binder.

Operating in this manner to produce high interfacial peel-adhesion, the present invention not only overcomes the problem of adhering a fluoropolymer to a non-fluoropolymer, but it also avoids the employment of specially treated polymeric surfaces to enable the use of conventional adhesives, or costly chemical reactions at the interface, which could detract from the overall properties of the composite and limit its utility. Importantly, the physical binder required can be very low in cost, and even inexpensive to process into the composite. Simple one- or two-step laminations at modest temperatures will frequently suffice.

DETAILED DESCRIPTION OF THE PREFERRED EMBODIMENT

The composite of the present invention comprises a non-woven, fibrous binder substantially embedded within both the fluoropolymeric and non-fluoropolymeric components throughout the interfacial surface area. Approximately 30–70% of the cross-sectional thickness of the binder is embedded in the fluoropolymeric component and 70–30% of the cross-sectional thickness of the binder is embedded in the non-fluoropolymeric component, respectively. Preferably, the binder is completely embedded into the fluoropolymeric and non-fluoropolymeric components such that there is no discrete layer of binder, and the components abut each other within the binder.

The fluoropolymeric component may be a monolithic film, i.e., one of a uniform composition throughout, constructed from FEP (fluorinated ethylene propylene), PFA (perfluoroalkyl vinyl ether copolymer with tetrafluoroethylene), PVDF (homopolymer of vinylidene difluoride), PVF (polyvinylflouride), PCTFE (homopolymer of chlorotrifluoroethylene), ETFE (copolymer of tetrafluoroethylene with ethylene), TFB (terpolymer of vinylidenedifluoride, hexafluoropropylene and tetrafluoroethylene), or blends thereof.

The fluoropolymeric component may also comprise a multilayer film which has a contact layer of fluoropolymer or non-fluoropolymer that is penetrated by the binder, and one or more backing layers that are not penetrated by the binder during processing. Preferably, one or more of the backing layers has a melting or softening temperature higher than that of the contact layer so that the backing layer can remain substantially solid during processing. Examples of some multilayer films include: FEP/PTFE multilayer films, TFB/PTFE multilayer films, PVDF/PTFE multilayer films, TFB/FEP multilayer films, PVDF/PVF multilayer films, PFA/PTFE multilayer films, TFB/PFA multilayer films, PVDF/FEP multilayer films and PVC/PVDF multilayer films.

As stated above, only a portion of the thickness of the non-woven binder is intended for embedment in the fluoropolymeric component. The remaining portion of the binder, i.e., that not embedded into the fluoropolymeric component, is intended for embedment, preferably complete embedment, into the non-fluoropolymeric component.

The fluoropolymeric component must possess in the surface to be penetrated by the binder a fluoropolymer or fluoropolymer-blend composition with a processing viscosity sufficient to allow embedment of the non-woven binder under conditions which will not induce significant attrition of the strength of the fibers in the non-woven binder.

The non-fluoropolymeric component may comprise reinforced or unreinforced PVC (polyvinylchloride), LDPE (low-density polyethylene) HDPE (high-density polyethylene), PET (poly(ethylene) terephthalate), PP (polypropylene), PC (polycarbonate), ABS (terapolymer of acrylonitrile, butadiene and styrene), silicones, epoxy resins, PEI (polyether-imide), polyamide, PPO (polyphenyleneoxide) and PBT (poly(butylene) terapthalate).

The non-woven binder may comprise aramids, polyesters, polyamides, polyimides, polyamide-imides, polyvinylalcohols, cellulosics, and blends thereof.

The composite of the present invention may be produced by a single- or two-step lamination process, which depends on the nature of the fluoropolymeric and non-fluoropolymeric components. The single-step lamination can be most advantageously carried out when both the fluoropolymeric and non-fluoropolymeric components melt flows are very similar at or above their softening or melting point, and the laminating process temperature meets the following criteria:

1. Process temperature ≧ softening or melting temperature of the non-fluoropolymeric component+(1–150° C.).
2. Process temperature produces a sufficient flow of polymer on the laminating face (or contact layer in multilayer) of the fluoropolymeric component to enable substantial embedment of the non-woven binder into the fluoropolymeric component.
3. Process temperature is below the melting or softening temperature of the binder.

The allowable viscosity for a fluoropolymeric component at the laminating interface which will facilitate embedment of the non-woven binder can vary widely, but is typically in the range of $0.1–5.0 \times 10^6$ poise. The actual viscosity employed in any given situation will depend on various factors, including the type of fluoropolymer utilized and the duration of applied pressure.

If the process temperature cannot meet the criteria for the single-step process, then the lamination is most advantageously carried out in a two-step process by first laminating a cross-sectional portion of the non-woven binder to one side of either the fluoropolymeric or non-fluoropolymeric component to create a "cladding," and then subsequently laminating the second component (non-fluoropolymeric or fluoropolymeric component, respectively) to the exposed non-woven binder at the binder face of the cladding. In the two-step process, for example, a lamination process could be advantageously carried out such that the choice of the first lamination (i.e. binder to non-fluoropolymeric component or binder to fluoropolymeric component) represents the higher of the two required lamination process temperatures based upon the following process temperature criteria:

1. Process temperature ≧ softening or melting temperature of the non-fluoropolymeric component substrate+ (1–150° C.).
2. Process temperature which results in a sufficient flow of polymer on the laminating face (or contact layer in a multilayer) of the fluoropolymeric component to enable embedment of the non-woven binder into the fluoropolymeric component.

The single-step and two-step processes are conveniently carried out within, but are not limited to, a range of temperatures from 290° F. to 660° F., a pressure of 0.5 to 140 psi, and for periods of time from 10 to 90 seconds.

In a preferred embodiment, a SONTARA non-woven polyester binder (Style 8017 manufactured by DuPont) is partially embedded into a 1.8 mil film comprising 0.8 mils of PTFE and 0.8 mils of PVDF, separated by a tie layer comprising PTFE and PVDF in equal amounts by weight. The PTFE serves to limit the depth of penetration of the polyester binder since it remains solid, while the polyester fiber is embedded into the PVDF. Optimally, about 50% of the cross-sectional thickness of the non-woven binder becomes embedded in the PVDF. After this fluoropolymer "cladding" is created, it can be laminated to a PVC-coated polyester fabric (Seaman Corporation, Style 8028) at a temperature below the melting point of the PTFE in the PVDF/PTFE fluoropolymeric film. Such a composite, when laminated in a static press at a set temperature of about 360° F. for the upper platen and ambient temperature for the lower platen, and pressure of approximately 140 psi for 90 seconds, after which is cooled to 125° F. under autogenous pressure, exhibits very good peel adhesion (>5 pli), approaching the tensile strength of the fluoropolymeric film itself.

In another embodiment, the PVC face of a fluoropolymeric, multilayer film of PVC/PVDF was laminated to a PVC coated, woven polyester fabric (Seaman Corp., Style 8028) by interposing a fibrous, non-woven binder (SONTARA 8017) and applying a pressure of 50 psi for 1 minute at 350° F. to prepare a laminated composite.

The laminate was examined by a peel test at a 90° angle such that the interface between the non-woven binder and multilayer film could be challenged. This resulted in failure of the film before any significant peeling occurred. In another peel test which challenged the interface between the non-woven binder and PVC coated fabric substrate at a 90° angle, the non-woven binder failed at 2 pli.

This laminated composite remained intact after immersing in boiling water for 18 hours, whereas a control omitting only the non-woven binder delaminated in 12 hours.

To demonstrate the utility of the present invention, attempts were made to create composites containing fluoropolymeric and non-fluoropolymeric components without the use of the non-woven binder, at a temperature which would not destroy either of the components. The process parameters used in these attempts and the results of such attempts can be found in the following Table A.

TABLE A

| Example | Non-fluoropolymer | Binder | Fluoropolymer Material[1] | Process[2] | Temp[3] | Time[4] | Press[5] | Adhesion[6] |
|---|---|---|---|---|---|---|---|---|
| A | PVC | none | TFB/PTFE 4 mil | 1 | 350° | 30 sec | 10 psi | 0.0 |
| B | PVC | none | FEP/5 mil | 1 | 550° | 10 sec | 10 psi | 0.0 |
| C | PVC | none | PFA/5 mil | 1 | 600° | 10 sec | 10 psi | 0.0 |
| D | PVC | none | PTFE/2 mil | 1 | 350° | 30 sec | 10 psi | 0.0 |
| E | LDPE | none | TF/PTFE 4 mil | 1 | 400° | 30 sec | 10 psi | 0.0 |
| F | LDPE | none | FEP/5 mil | 1 | 400° | 30 sec | 10 psi | 0.0 |
| G | HDPE | none | TFB/PTFE 4 mil | 1 | 450° | 30 sec | 10 psi | 0.0 |
| H | PP | none | FEP/5 mil | 1 | 500° | 30 sec | 10 psi | 0.0 |
| I | ABS | none | FEP/5 mil | 1 | 500° | 30 sec | 10 psi | 0.0 |
| J | PET | none | FEP/PTFE 5 mil FEP/1 mil | 1 | 550° | 30 sec | 10 psi | 0.0 |
| K | PC | none | TFB/PTFE 4 mil | 1 | 500° | 30 sec | 10 psi | 1.19 |

Footnotes
[1]FEP fluorinated ethylene-propylene copolymer;
TFB = random terpolymer of vinylidenedifluoride, hexafluoropropylene and tetrafluoroethylene;
PTFE = polytetrafluoroethylene (multilayer films are separated by a slash and the film thickness is indicated in mils).
The first listed fluoropolymer material is the composition which was on the film side laminated to the binder.
[2]1 = single step lamination; 2 = two-step lamination process.
[3]Temperature (° F.)
[4]Time of lamination in seconds.
[5]Pressure of lamination in psi.
[6]Adhesion strength in pounds/linear inch (peak value).

By contrast, the process of the present invention facilitates the creation of composites containing fluoropolymeric and non-fluoropolymeric components which would otherwise exhibit little or no interfacial strength, as measured by peel adhesion. (See Table B)

TABLE B

| Example | Non-fluoropolymer | Binder[1] | Fluoropolymer Material[2] | Process[3] | Temp[4] | Time[5] | Press[6] | Adhesion[7] |
|---|---|---|---|---|---|---|---|---|
| A | PVC | E88 | FEP/5 mil | 2 | 550°/350° | 30 sec | 10 psi | 9 |
| B | PVC | E88 | PFA/5 mil | 2 | 600°/350° | 30 sec | 10 psi | 5.5 |
| C | PVC | E89 | TFB/PTFE 4 mil | 1 | 350° | 30 sec | 10 psi | 12.0 |
| D | PVC | 005-230 | TFB/PTFE 4 mil | 1 | 350° | 30 sec | 10 psi | 0.12 |
| E | LDPE | E88 | TFB/PTFE 4 mil | 1 | 400° | 30 sec | 10 psi | 6.1 |
| F | LDPE | E88 | FEP/PTFE 5 mil FEP/1 mil | 2 | 550°/400° | 30 sec | 10 psi | 12.82 |
| G | HDPE | E88 | TFB/PTFE 4 mil | 1 | 450° | 30 sec | 10 psi | 6.3 |
| H | Silicone | E88 | FEP/PTFE 5 mil FEP/1 mil | 2 | 550°/300° | 30 sec | 10 psi | 1.8 |
| I | Epoxy | E88 | FEP/PTFE 5 mil FEP/1 mil | 2 | 550°/300° | 30 sec | 10 psi | 9.2 |
| J | PET | E88 | FEP/PTFE 5 mil FEP/1 mil | 1 | 550° | 30 sec | 10 psi | 7.0 |
| K | PP | E88 | TFB/PTFE 4 mil | 1 | 500° | 30 sec | 10 psi | 8.4 |
| L | ABS | E88 | TFB/PTFE 4 mil | 1 | 500° | 30 sec | 10 psi | 6.8 |
| M | PC | E88 | TFB/PTFE 4 mil | 1 | 500° | 30 sec | 10 psi | 9.28 |
| N | PVC | 8017 | TFB/PTFE 4 mil | 1 | 400° | 30 sec | 10 psi | 6.07 |

Footnotes
[1]E88 = spunlace non-woven binder NOMEX Style 8307 (DuPont);
E89 = non-woven binder KEVLAR/NOMEX (DuPont);
005-230 = non-woven fiber glass (Electrolock);
8017 = spunlace polyester [PET] Style 8017 (DuPont).
[2]FEP fluorinated ethylene-propylene copolymer;
TFB = random terpolymer of vinylidenedifluoride, hexafluoropropylene and tetrafluoroethylene;
PTFE = polytetrafluoroethylene (multilayer films are separated by a slash and the film thickness is indicated in mils).
The first listed fluoropolymer material is the composition which was on the film side laminated to the binder.
[3]1 = single step lamination; 2 = two-step lamination process.
[4]Temperature (° F.)
[5]Time of lamination in seconds.
[6]Pressure of lamination in psi.
[7]Adhesion strength in pounds/linear inch (peak value).

The invention is not limited in any way to the foregoing examples. It is believed that the process of the invention may be used to create composites of a variety of thermally non-adherent materials. It is foreseen that the non-fluoropolymeric component could be any material, provided that such material can be made flowable at the surface contacting the binder, at temperatures below the melting or softening point of the binder.

What is claimed is:

1. A composite of thermally non-adherent materials, comprising:

(1) a fluoropolymeric component, said fluoropolymeric component being a monolithic film selected from the group consisting of fluorinated ethylene propylene, perfluoroalkyl vinyl ether-tetrafluoroethylene copolymer, vinylidene difluoride homopolymer, polyvinylflouride, chlorotrifluoroethylene homopolymer, tetrafluoroethylene-ethylene copolymer, vinylidenedifluoride-hexafluoropropylene-tetrafluoroethylene terpolymer, and blends thereof;

(2) a non-fluoropolymeric component characterized by thermal non-adherence to said fluoropolymeric component wherein said non-fluoropolymeric component is selected from the group consisting of reinforced or unreinforced polyvinylchloride, low-density polyethylene, high-density polyethylene, poly(ethylene) terephthalate, polypropylene, polycarbonate, acrylonitrile-butadiene-styrene terpolymer, epoxy resins, polyether-imide, polyamide, polyphenylene-oxide, and poly(butylene) terephthalate; and (3) a non-woven, fibrous binder wherein said non-woven binder has a first portion of its cross-sectional thickness embedded in said fluoropolymeric component and a second portion of its cross-sectional thickness embedded in said non-fluoropolymeric component,
said binder containing fibers for mechanically anchoring said fluoropolymeric and non-fluoropolymeric components, said fibers having longitudinal segments extending into both components, and said fibers crossing the interface between said components in a direction that is approximately normal to the interface,
wherein the fibers of said non-woven binder are selected from the group consisting of aramids, polyesters, polyamides, polyimides, polyamide-imides, polyvinylalcohols, cellulosics and blends thereof; and wherein the composite does not contain an adhesive and the composite exhibits a peel adhesion of greater than about 5 pounds/linear inch.

2. A composite according to claim 1, wherein said first portion is from 30–70% of the cross-sectional thickness of said binder and said second portion is from 70–30% of the cross-sectional thickness of said binder, respectively.

3. A composite according to claim 2, wherein said binder is completely embedded into said fluoropolymeric and non-fluoropolymeric components such that there is no discrete layer of said binder, and said fluoropolymeric and non-fluoropolymeric components abut each other within said binder.

4. A composite of thermally non-adherent materials, comprising:

(1) a fluoropolymeric component, said fluoropolymeric component being a multilayer film which comprises a contact layer of fluoropolymer or non-fluoropolymer and one or more fluoropolymeric backing layers, wherein said multilayer film is selected from the group consisting of multilayer films having a fluorinated ethylene propylene layer and a polytetrafluoroethylene layer, multilayer films having a vinylidenedifluoride-hexafluoropropylene-tetrafluoroethylene terpolymer layer and a polytetrafluoroethylene layer, multilayer films having a vinylidene difluoride homopolymer layer and a polytetrafluoroethylene layer, multilayer films having vinylidenedifluoride-hexafluoropropylene-tetrafluoroethylene terpolymer layer and a fluorinated ethylene propylene layer, multilayer films having a vinylidene difluoride homopolymer layer and a polyvinylflouride layer, multilayer films having a perfluoroalkyl vinyl ether-tetrafluoroethylene copolymer layer and a polytetrafluoroethylene layer, multilayer films having a vinylidenedifluoride-hexafluoropropylene-tetrafluoroethylene terpolymer layer and a perfluoroalkyl vinyl ether-tetrafluoroethylene copolymer layer, multilayer films having a vinylidene difluoride homopolymer layer and a fluorinated ethylene propylene layer, and multilayer films having a polyvinylchloride layer and a vinylidene difluoride homopolymer layer;

(2) a non-fluoropolymeric component characterized by thermal non-adherence to said fluoropolymeric component wherein said non-fluoropolymeric component is selected from the group consisting of reinforced or unreinforced polyvinylchloride, low-density polyethylene, high-density polyethylene, poly (ethylene) terephthalate, polypropylene, polycarbonate, acrylonitrile-butadiene-styrene terpolymer, epoxy resins, polyether-imide, polyamide, polyphenylene-oxide, and poly(butylene) terephthalate; and (3) a non-woven, fibrous binder wherein said non-woven binder has a first portion of its cross-sectional thickness embedded in said contact layer of fluoropolymeric component with said one or more backing layers not being penetrated by said binder, and a second portion of said non-woven binder's cross-sectional thickness embedded in said non-fluoropolymeric component, said binder containing fibers for mechanically anchoring said fluoropolymeric and non-fluoropolymeric components, said fibers having longitudinal segments extending into both components, and said fibers crossing the interface between said components in a direction that is approximately normal to the interface, wherein the fibers of said non-woven binder are selected from the group consisting of aramids, polyesters, polyamides, polyimides, polyamide-imides, polyvinylalcohols, cellulosics and blends thereof; and wherein the composite does not contain an adhesive and the composite exhibits a peel adhesion of greater than about 5 pounds/linear inch.

5. A composite according to claim 4, wherein said first portion is from 30–70% of the cross-sectional thickness of said binder and said second portion is from 70–30% of the cross-sectional thickness of said binder, respectively.

6. A composite according to claim 5, wherein said binder is completely embedded into said fluoropolymeric and non-fluoropolymeric components such that there is no discrete layer of said binder, and said fluoropolymeric and non-fluoropolymeric components abut each other within said binder.

7. A composite according to any one of claims 4–6, wherein at least one backing layer has a higher melting or softening temperature than said contact layer so that said backing layer remains substantially solid during formation of the composite.

8. A method of making the composite of any one of claims 1–6, the method comprising:

(a) selecting a non-woven binder which has a melting or softening temperature higher than temperatures required to make said fluoropolymeric and non-fluoropolymeric components flowable at surfaces which contact said binder;

(b) positioning said non-woven binder between said fluoropolymeric and said non-fluoropolymeric components;

(c) applying suitable heat to make said fluoropolymeric and non-fluoropolymeric components flowable at surfaces which contact said binder; and (d) applying suitable pressure to embed a first portion of the cross-sectional thickness of said non-woven binder into said fluoropolymeric component and a second portion of the cross-sectional thickness of said non-woven binder into said non-fluoropolymeric component, such that the fibers of said binder have longitudinal segments extending into both components and said fibers cross the interface between said components in a direction that is approximately normal to the interface.

9. A composite according to claim 8, wherein if said fluoropolymeric component is said multilayer film comprising said contact layer and one or more said backing layers, at least one backing layer in said multilayer film has a higher melting or softening temperature than said contact layer so that said backing layer remains substantially solid during formation of the composite.

10. A method of making the composite of any one of claims 1–6, the method comprising:

(a) selecting a non-woven binder which has a melting or softening temperature higher than temperatures required to make said fluoropolymeric and non-fluoropolymeric components flowable at surfaces which contact said binder;

(b) contacting said non-woven binder to said fluoropolymeric component;

(c) applying suitable heat to make said fluoropolymeric component flowable at a surface which is in contact with said binder, and suitable pressure to embed a portion of the cross-sectional thickness of said non-woven binder into said fluoropolymeric component such that the fibers in said binder have longitudinal segments extending into said fluoropolymeric component and said fibers cross the embedment interface at an angle that is approximately normal to the interface to create a fluoropolymeric cladding which presents an exposed non-woven binder on one face;

(d) contacting said exposed non-woven binder of said cladding to said non-fluoropolymeric component; and (e) applying suitable heat to make said non-fluoropolymeric component flowable at a surface which is in contact with said non-woven binder, and suitable pressure to embed substantially all of said exposed non-woven binder into said non-fluoropolymeric component such that the fibers in said binder have longitudinal segments extending into said non-fluoropolymeric component and said fibers cross the embedment interface at an angle that is approximately normal to the interface.

11. A composite according to claim 10, wherein if said fluoropolymeric component is said multilayer film comprising said contact layer and one or more said backing layers, at least one backing layer in said multilayer film has a higher melting or softening temperature than said contact layer so that said backing layer remains substantially solid during formation of the composite.

12. A method of making the composite of any one of claims 1–6, the method comprising:

(a) selecting a non-woven binder which has a melting or softening temperature higher than temperatures required to make said fluoropolymeric and non-fluoropolymeric components flowable at surfaces which contact said binder;

(b) contacting said non-woven binder to said non-fluoropolymeric component;

(c) applying suitable heat to make said non-fluoropolymeric component flowable at a surface which is in contact with said binder, and suitable pressure to embed a portion of the cross-sectional thickness of said non-woven binder into said non-fluoropolymeric component such that the fibers in said binder have longitudinal segments extending into said non-fluoropolymeric component and said fibers cross the embedment interface at an angle that is approximately normal to the interface to create a non-fluoropolymeric cladding which presents an exposed non-woven binder at one surface;

(d) contacting said exposed non-woven binder of said cladding to said fluoropolymeric component; and (e) applying suitable heat to make said fluoropolymeric component flowable at a surface which is in contact with said non-woven binder, and suitable pressure to embed substantially all of said exposed non-woven binder into said non-fluoropolymeric component such that the fibers in said binder have longitudinal segments extending into said fluoropolymeric component and said fibers cross the embedment interface at an angle that is approximately normal to the interface.

13. A composite according to claim 12, wherein if said fluoropolymeric component is said multilayer film comprising said contact layer and one or more said backing layers, at least one backing layer in said multilayer film has a higher melting or softening temperature than said contact layer so that said backing layer remains substantially solid during formation of the composite.

* * * * *